United States Patent
Yamamoto et al.

(10) Patent No.: US 8,139,033 B2
(45) Date of Patent: Mar. 20, 2012

(54) INPUT DEVICE

(75) Inventors: Tamotsu Yamamoto, Hyogo (JP);
Shinichi Takasaki, Osaka (JP); Yoshio Naka, Osaka (JP)

(73) Assignee: Panasonic Corporation, Osaka (JP)

( * ) Notice: Subject to any disclaimer, the term of this patent is extended or adjusted under 35 U.S.C. 154(b) by 746 days.

(21) Appl. No.: 12/256,006

(22) Filed: Oct. 22, 2008

(65) Prior Publication Data
US 2009/0102795 A1    Apr. 23, 2009

(30) Foreign Application Priority Data
Oct. 23, 2007    (JP) ................................. 2007-274975

(51) Int. Cl.
*G06F 3/033*    (2006.01)
(52) U.S. Cl. ....................................................... 345/167
(58) Field of Classification Search .................... 345/167
See application file for complete search history.

(56) References Cited

U.S. PATENT DOCUMENTS

| | | | | |
|---|---|---|---|---|
| 6,144,370 A * | 11/2000 | Eleyan et al. | .................. | 345/167 |
| 6,501,458 B2 * | 12/2002 | Baker et al. | .................... | 345/161 |
| 6,809,722 B2 * | 10/2004 | Mei et al. | ...................... | 345/163 |
| 2004/0164963 A1 * | 8/2004 | Ono et al. | ...................... | 345/167 |

FOREIGN PATENT DOCUMENTS

| | | |
|---|---|---|
| JP | 2002-140160 A | 5/2002 |
| JP | 2007-026025 | 2/2007 |
| JP | 2007-026026 | 2/2007 |

OTHER PUBLICATIONS

Chinese Office action for Appl. No. 200810171396.0 dated Jul. 8, 2010.

* cited by examiner

*Primary Examiner* — Quan-Zhen Wang
*Assistant Examiner* — Tony Davis
(74) *Attorney, Agent, or Firm* — Pearne & Gordon LLP

(57) ABSTRACT

An input device includes a ball having a magnetic body therein. The magnetic body includes projections radially extending from the core toward the outer periphery of the ball. The device also includes a ring magnet and magnet detection elements surrounded by a lower area of the ball so as to be opposite thereto. The structure allows the input device to be protected from dust and dirt during long-term use so as to maintain a good tactile feel in a simple structure. Because, the input device has no components such as rollers that are in contact with the ball.

3 Claims, 5 Drawing Sheets

INPUT DEVICE

BACKGROUND OF THE INVENTION

1. Field of the Invention

The present invention relates to an input device used to operate various electronic apparatuses.

2. Background Art

In recent years, electronic apparatuses such as portable telephones and personal computers are increasing in functionality and decreasing in size. These apparatuses are required to have an input device having a good tactile feel and reliable operation.

FIG. 6 is a partial front view of a conventional input device. As shown in FIG. 6, the input device includes ball 1 and a pair of cylindrical rollers 2A, 2B. Ball 1 is made of an insulating resin and rotatably housed in a case (unillustrated) made of an insulating resin. Cylindrical rollers 2A and 2B are made of an insulating resin and arranged perpendicular to each other in contact with the outer periphery of ball 1.

Ring magnets 3A and 3B are fixed to ends of rollers 2A and 2B, respectively. The input device further includes a pair of ring magnets 3A and 3B, in which N- and S-poles are alternately magnetized at a predetermined pitch.

The input device further includes wiring board 4 and a pair of magnetic detection elements 5A and 5B which are, for example, hall elements. Wring board 4 is provided on its upper and lower surfaces with wiring patterns (unillustrated) and disposed below ball 1. Magnetic detection elements 5A and 5B are mounted on the upper surface of wiring board 4 in such a manner as to face ring magnet 3A on roller 2A and ring magnet 3B on roller 2B, respectively, with a predetermined spacing therebetween.

The input device having the above-described structure is attached to an operating part (unillustrated) of an electronic apparatus such as a portable telephone or a personal computer in such a manner as to project the top portion of ball 1. Magnetic detection elements 5A and 5B are electrically connected to an electronic circuit (unillustrated) of the apparatus through the wiring patterns and the like.

In the above-described structure, the user rolls ball 1 with the thumb, fingers, or the palm of the hand in the right-and-left direction. The user rolls ball 1 while viewing menus including, for example, singer names and song titles, and a cursor (unillustrated) displayed on a display part (unillustrated) of the apparatus. The display part can be a liquid crystal display element or the like. This results in rotation of roller 2A in contact with ball 1 and hence, a rotation of ring magnet 3A attached to the end of roller 2A. As a result, magnetic detection element 5A opposite to ring magnet 3A detects magnetic changes in ring magnet 3A and outputs a predetermined pulse signal to the electronic circuit of the apparatus. The electronic circuit detects the direction and angle of rotation of ball 1 from the pulse signal and moves the cursor on a menu displayed on the display part of the apparatus in, for example, the right-and-left direction.

Similarly, when the user rolls ball 1 in the back-and-forth direction perpendicular to the right-and-left direction, roller 2B rotates to cause magnetic changes in ring magnet 3B. As a result, magnetic detection element 5B opposite to ring magnet 3B detects the magnetic changes in ring magnet 3B and outputs a pulse signal to the electronic circuit of the apparatus. This results in movement of the cursor or the like in, for example, the up and down direction.

When the user rolls ball 1 in an oblique direction, both rollers 2A and 2B rotate to cause magnetic changes both in ring magnets 3A and 3B. As a result, both magnetic detection elements 5A and 5B detect these magnetic changes and output two pulse signals to the electronic circuit of the apparatus. This results in movement of the cursor or the like in, for example, the right upper direction or the left lower direction.

Thus, the input device enables the user to move the cursor or the like on the display part of the apparatus in a predetermined direction by rolling ball 1 in a predetermined direction, so that the user can make a choice from the menus including, for example, singer names and song titles.

One such conventional technique related to the present invention is shown in Japanese Patent Unexamined Publication No. 2007-26026.

In the above-described conventional input device, the rotation of ball 1 results in rotation of rollers 2A and 2B arranged perpendicular to each other in contact with ball 1. This structure causes ball 1 to gather dust and dirt with time during use, and the dust and dirt accumulated between ball 1 and roller 2A or 2B can cause a scratchy or rasping feel when the user rolls ball 1.

SUMMARY OF THE INVENTION

An object of the present invention is to provide an input device having a good tactile feel in a simple structure.

An input device of the present invention includes a ball having a magnetic body therein. The magnetic body includes projections radially extending from the core toward the outer periphery of the ball. The device also includes ring magnet and magnet detection elements arranged below the ball so as to be opposite thereto. The ring magnets surround the lower area of the ball. The magnet detection elements detect a change of magnetic field. Thus, the input device has no components such as rollers that are in contact with the ball, thereby being protected from dust and dirt during long-term use and hence maintaining a good tactile feel in a simple structure. We have no difficulty in rotating the ball.

DETAILED DESCRIPTION OF THE INVENTION EMBODIMENT

Figure 1:
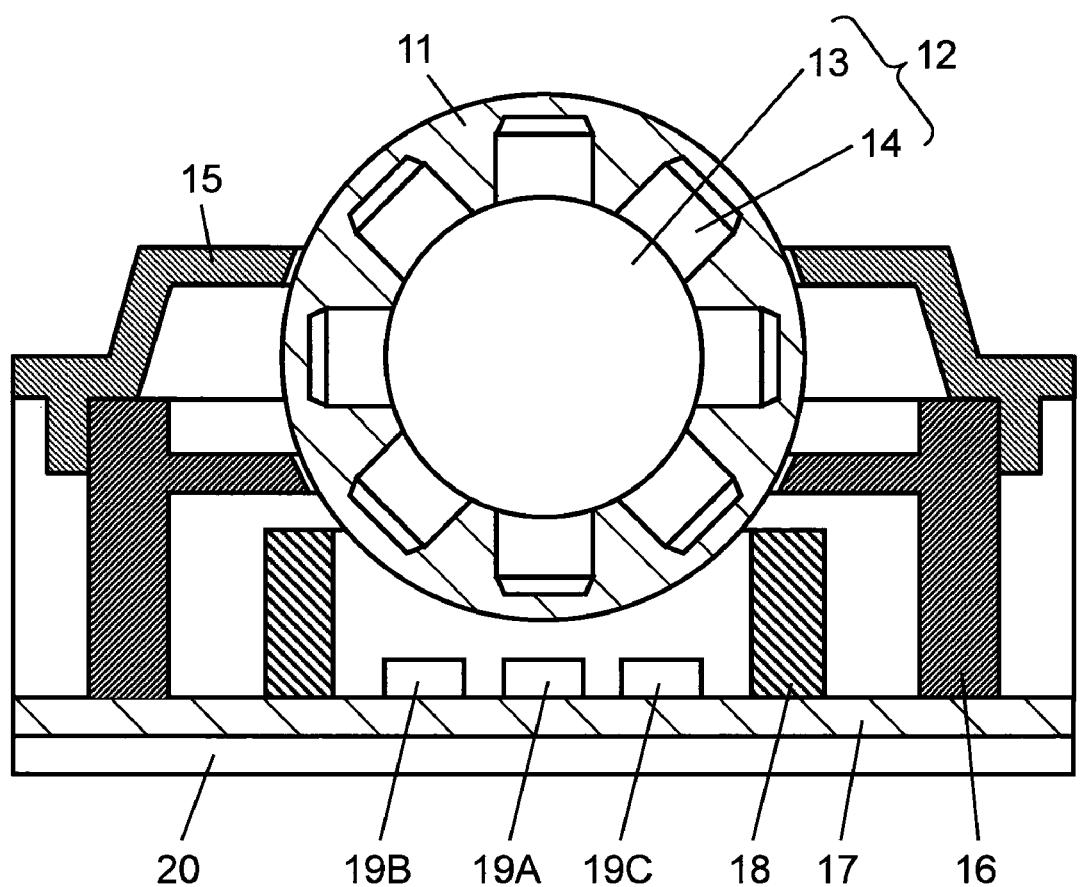
FIG. 1 is a sectional view of an input device according to an embodiment of the present invention.

FIG. 1 is a sectional view of an input device of an embodiment of the present invention. As shown in FIG. 1, the input device includes ball 11 made of an insulating resin such as ABS, polycarbonate, or polyurethane. Ball 11 includes magnetic body 12 made of permalloy, iron, an Ni—Fe alloy, or the like. Magnetic body 12 includes spherical core 13 and a plurality of cylindrical projections 14 radially extending from core 13 toward the outer periphery of ball 11.

The input device further includes upper case 15 and lower case 16. Upper case 15 is box-shaped and made of an insulating resin such as polystyrene or ABS. Upper and lower cases 15 and 16 are provided at their centers with openings whose inner peripheries are inclined in opposite directions. Ball 11 is rotatably fitted into these openings in such a manner that the top portion of ball 11 projects beyond the top surface of upper case 15.

The input device further includes wiring board 17, which is made of paper phenol or glass-containing epoxy, and provided on its upper and lower surfaces with wiring patterns (unillustrated). The upper surface of wiring board 17 is provided, at the portion just below ball 11, with ring magnet 18 made of ferrite, an Nd—Fe—B alloy, or the like. Wiring board 17 is placed with the N-pole up and the S-pole down. The lower area of the ball 11 is surrounded by ring magnets 18. We can also place wiring board 17 with the N-pole down and the S-pole up.

The upper surface position of wiring board 17 is provided, inside the magnet 18 with magnet detection elements 19A, 19B, 19C, and 19D. Hall elements or GMR elements are used as the magnetic detection elements. The Hall elements detect vertical magnetic fields and the GMR elements detect horizontal magnetic fields. The magnet detection elements 19A-19D detect the change of vertical magnetic fields. Magnet detection elements 19A-19D are opposite to and predeterminedly spaced from ball 11.

Figure 2:
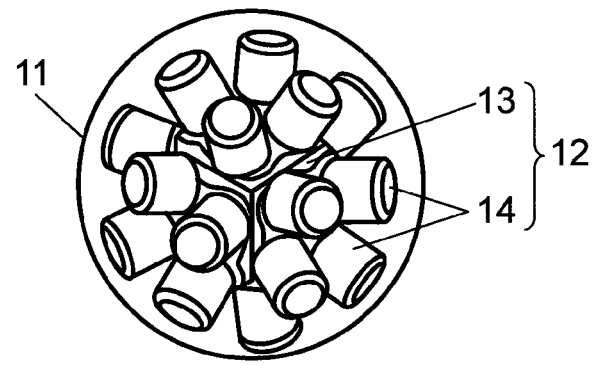
FIG. 2 is a partial perspective view of the input device according to the embodiment.
Figure 2:
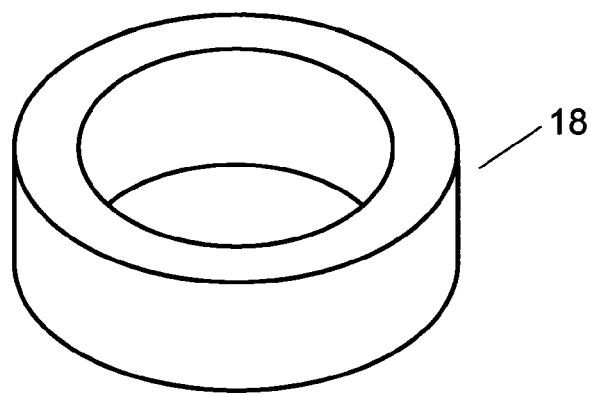
Figure 2:
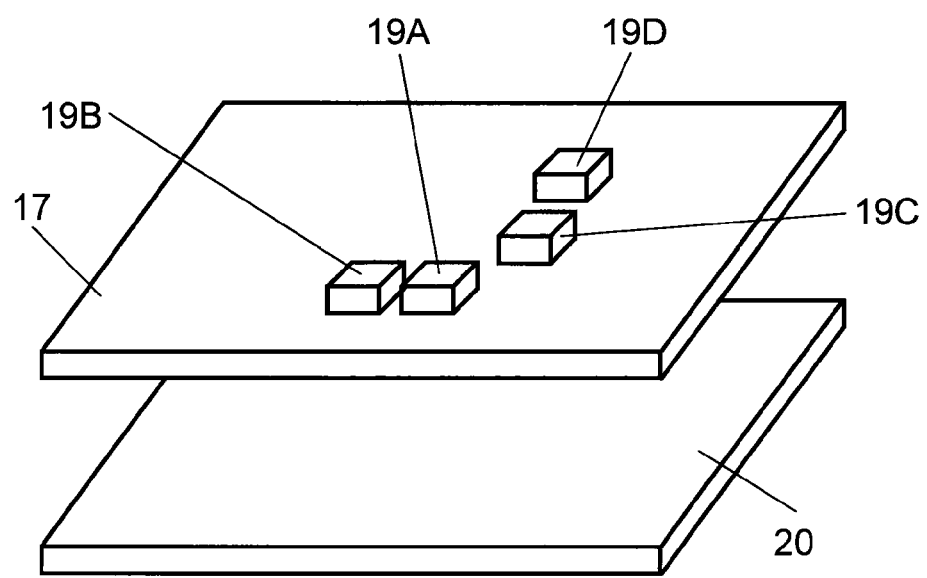

FIG. 2 is a partial perspective view of the input device of the embodiment. As shown in FIG. 2, magnet detection elements 19A and 19B are parallelly arranged at a predetermined spacing from each other in the right-and-left direction, and magnet detection elements 19C and 19D are parallelly arranged at a predetermined spacing from each other in the back-and-forth direction. The lower surface of wiring board 17 is provided with yoke 20 of steel or the like. The upper surfaces of magnet detection elements 19a-19D and of wiring board 17 are covered with lower case 16. The yoke 20 is arranged so that magnetic fields may form magnetic loop. For example, the magnetic fields from the N-pole of magnet 18 flow back to the S-pole of magnet 18 via magnetic body 12 in the ball 11 and the yoke 20.

The input device thus structured is attached to an operating part (unillustrated) of an electronic apparatus such as a portable telephone or a personal computer in such a manner as to project the top portion of ball 11. Magnet detection elements 19A-19D are electrically connected to an electronic circuit (unillustrated) of the apparatus through the wiring patterns and the like.

Figure 3A:
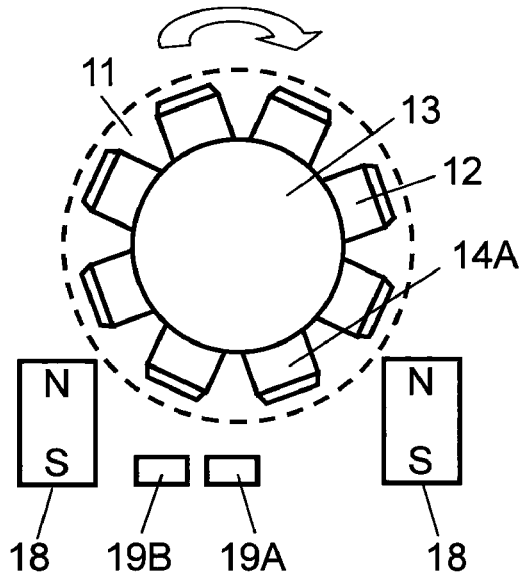
FIG. 3A is a partial front view of the input device according to the embodiment.

FIGS. 3A-3D are partial front views of the input device of the embodiment. As shown in FIG. 3A, the user rolls ball 11 rightward with the thumb, fingers, or the palm of the hand. The user rolls ball 11 with menus including, for example, singer names and song titles, and a cursor (unillustrated) displayed on a display part (unillustrated) of the apparatus. The display part can be a liquid crystal display element or the like. This allows projection 14A of magnetic body 12 inside ball 11 to approach magnet detection element 19A.

Figure 3C:
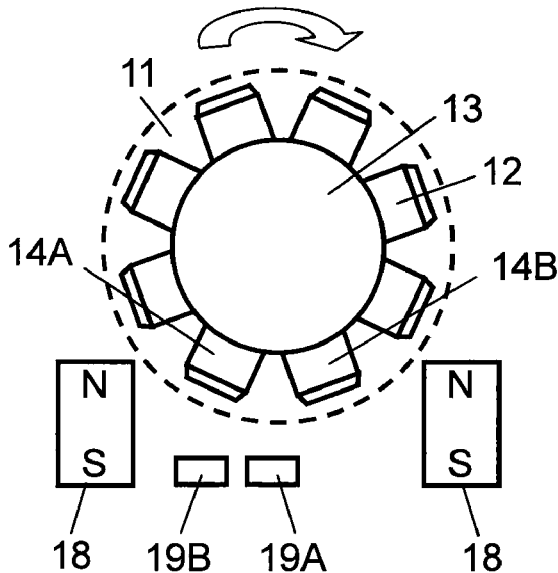
FIG. 3C is another partial front view of the input device according to the embodiment.
Figure 3B:
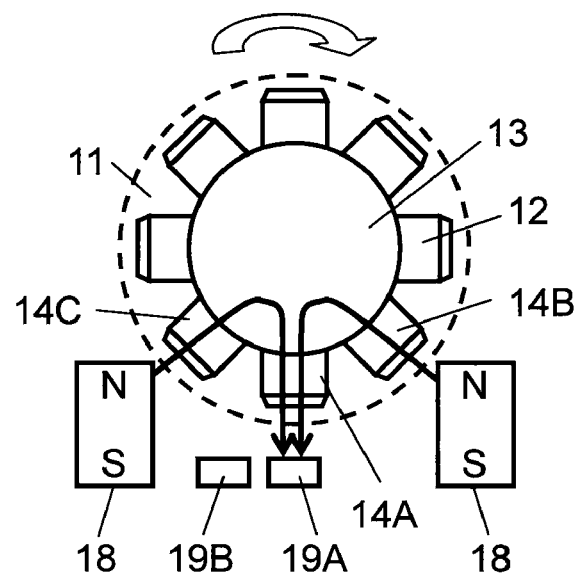
FIG. 3B is another partial front view of the input device according to the embodiment.

As shown in FIG. 3B, when projection 14A approaches closest to magnet detection element 19A, magnet detection element 19A detects the right- and left-side N-pole magnetic fields of cylindrical magnet 18. The lower area of ball 11 is surrounded by ring magnet 18. Magnet detection element 19A detects the magnetic fields from projections 14B and 14C closest to magnet 18 though core 13 and projection 14A. The structure of magnet 18 surrounding the lower area of the ball 11 makes it easy to cause the close disposition to the ball 11. Moreover, the distance between the N-pole and the S-pole of the magnet 18 is naturally wide. Therefore, we can make the stable magnetic loop above mentioned.

When the user continues to roll ball 11, as shown in FIG. 3C, projection 14A leaves magnet detection element 19A, and then projection 14B approaches magnet detection element 19A.

Figure 3D:
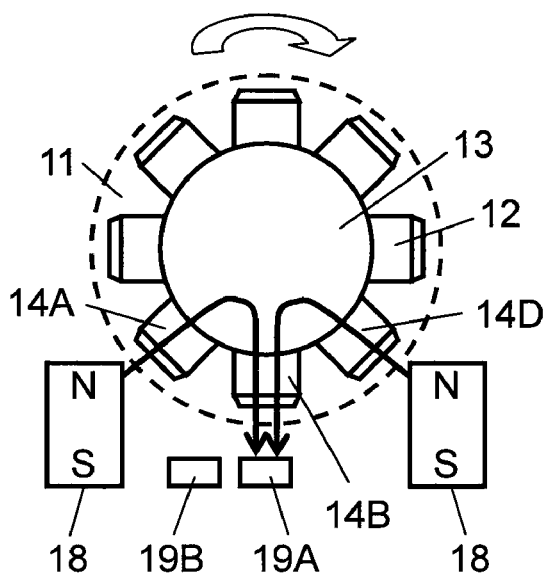
FIG. 3D is another partial front view of the input device according to the embodiment.

Then, as shown in FIG. 3D, projection 14B approaches closest to magnet detection element 19A. At this moment, for example, magnet detection element 19A detects the N-pole magnetic fields of magnet 18 from projections 14A and 14D closest to magnet 18 through core 13 and projection 14B.

Thus, while ball 11 is rotated as shown in FIGS. 3A through 3D, magnet detection element 19A detects the magnetic fields of the N-pole when projection 14A approaches closest thereto, and when, after the magnetic fields are once reduced, projection 14B approaches closest thereto.

Figure 4A:
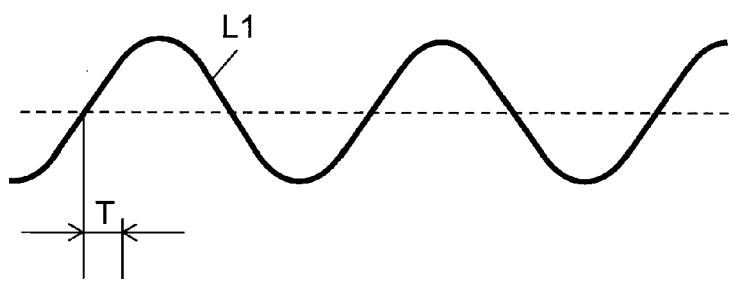
FIG. 4A shows a waveform of a detection signal of a magnet detection element of the input device according to the embodiment.

FIG. 4A shows a waveform of a detection signal of magnet detection element 19A, which outputs detection signal L1 for two cycles to the electronic circuit of the apparatus.

Figure 4B:
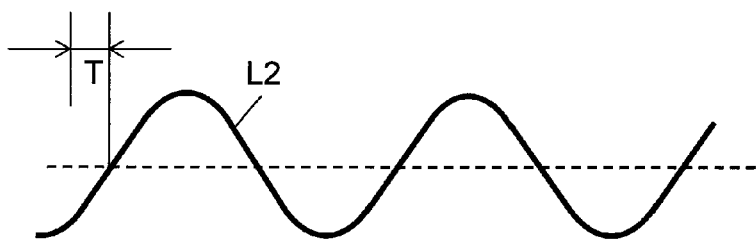
FIG. 4B shows a waveform of a detection signal of another magnet detection element of the input device according to the embodiment.

FIG. 4B shows a waveform of a detection signal of magnet detection element 19B, which is parallelly arranged with magnet detection element 19A so as to detect the N-pole magnetic field of magnet 18 in the same manner. Magnet detection element 19B is predeterminedly spaced from magnet detection element 19A. Consequently, magnet detection element 19B outputs detection signal L2, which is delayed by time T, or has a phase difference, from detection signal L1 of magnet detection element 19A.

When the user rolls ball 11 in the opposite (left) direction, magnet detection element 19A outputs detection signal L2, and magnet detection element 19B outputs detection signal L1, which is delayed by time T, or has a phase difference, from detection signal L2.

Then, the electronic circuit of the apparatus determines which has risen earlier (which has earlier crossed its mean value shown in a dotted line) between detection signals L1 and L2 having a phase difference therebetween. The electronic circuit thus detects the rotation direction of ball 11. The electronic circuit further detects the rotation angle of ball 11 from the number of rises of detection signals L1 and L2 (the number of times that detection signals L1 and L2 have crossed their mean values shown in dotted lines). The electronic circuit then moves the cursor or the like on a menu on the display part of the apparatus, for example, rightward or leftward, based on the detected direction and angle of rotation of ball 11.

When the user rolls ball 11 in the back-and-forth direction perpendicular to the aforementioned direction, magnet detection elements 19C and 19D parallelly arranged on wiring board 17 in the back-and-forth direction perpendicular to magnet detection elements 19A and 19B detect the magnetic fields of magnet 18 from projections 14 in the same manner as above. As a result, magnet detection elements 19C and 19D output two detection signals having a phase difference therebetween so as to move the cursor or the like, for example, upward or downward.

When the user rolls ball 11 in an oblique direction, magnet detection elements 19A and 19B arranged in the right-and-left direction output two detection signals having a phase difference therebetween to the electronic circuit of the apparatus. Similarly, magnet detection elements 19C and 19D arranged in the back-and-forth direction perpendicular to the right-and-left direction output two detection signals having a phase difference therebetween to the electronic circuit of the apparatus. Then, the electronic circuit moves the cursor or the like in, for example, the right upper direction or the left lower direction.

Thus, the input device of the present invention enables the user to move the cursor or the like on the display part in a predetermined direction by rolling ball 11 in a predetermined direction, so that the user can make a choice from the menus including, for example, singer names and song titles. Magnetic body 12, which has projections 14 radially extending from core 13 toward the outer periphery of ball 11, is arranged inside ball 11. Magnet detection elements 19A-19D, which are opposite to and predeterminedly spaced from ball 11, detect the magnetic fields of ring magnet 18 through magnetic body 12 so as to detect the direction and angle of rotation ball 11.

The input device has no components such as rollers that are in contact with ball 11 rotatably fitted into the openings of upper and lower cases 15 and 16. With this structure, when ball 11 gathers dust and dirt with time during use and the dust and dirt enter the input device through the gaps between ball 11 and the openings, they are only deposited onto the upper surfaces of lower case 16 and wiring board 17. As a result, the input device maintains a good tactile feel. We can have smooth operation easily so long as the ball 11 rotates.

Furthermore, the input device has a simple structure consisting mainly of ball 11 having magnetic body 12 therein, and magnet 18 and magnet detection elements 19A-19D surrounding ball 11. In addition, the input device can cause no scratchy or rasping feel after long-term use, thus maintaining a good tactile feel.

Magnetic body 12 arranged inside ball 11 transmits the magnetic fields of magnet 18 as described above, but is not magnetized itself. Therefore, when the input device is used outdoors, ball 11 does not attract iron sand or the like. In addition, when a magnetic card or like is placed near the input device, it is not affected by the device.

Figure 5:
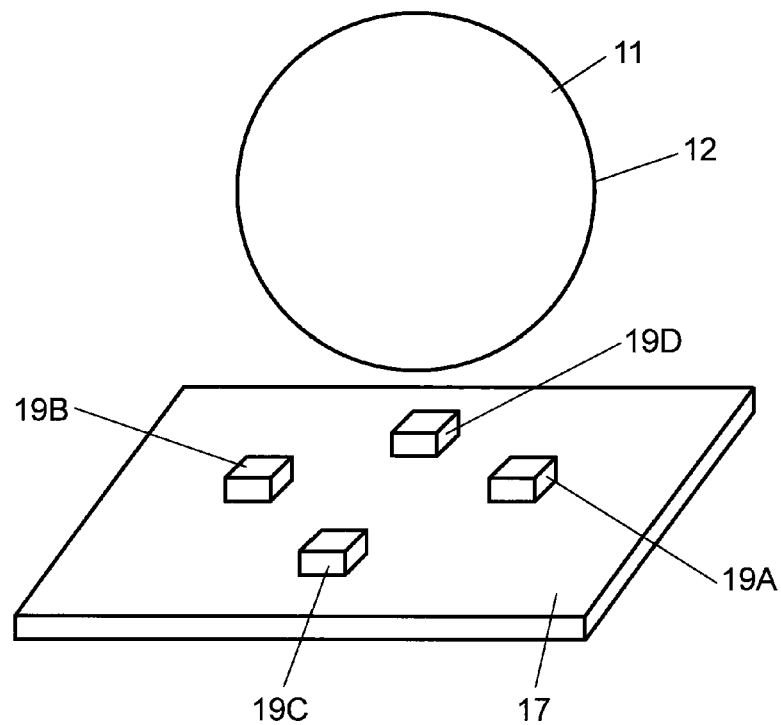
FIG. 5 is a partial perspective view of another input device according to the embodiment.
Figure 6:
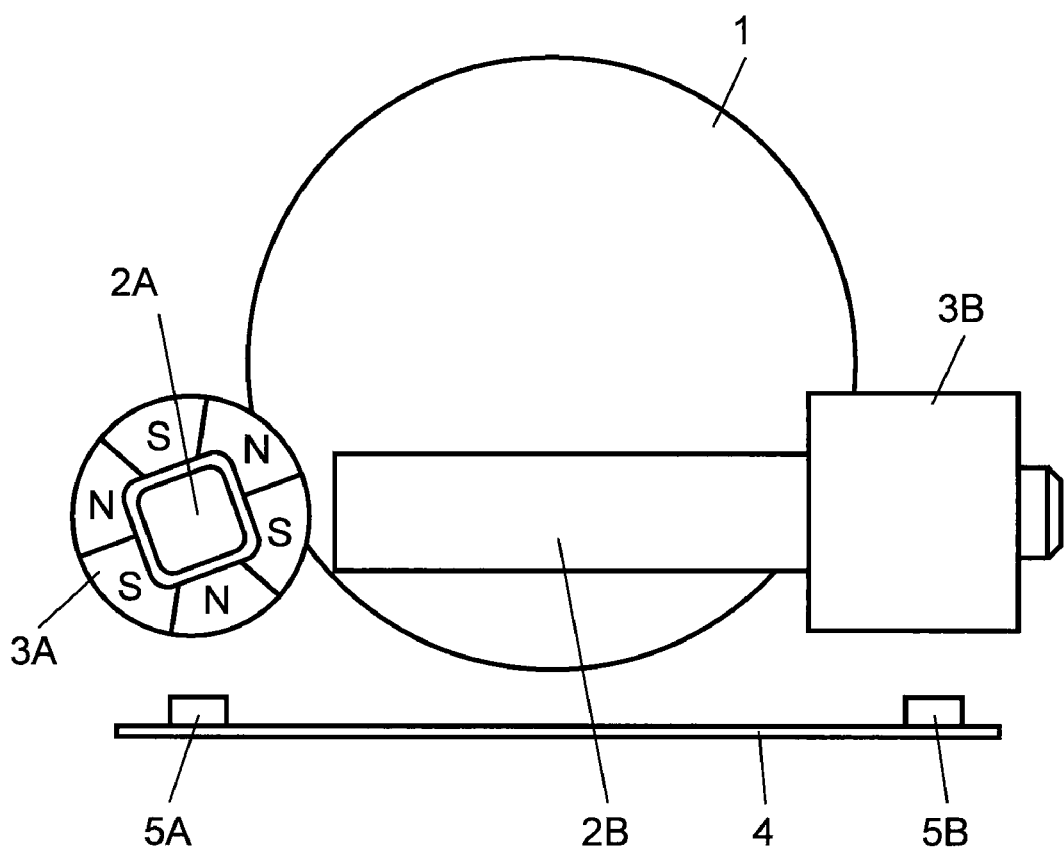
FIG. 6 is a partial front view of a conventional input device.

FIG. 5 is a partial perspective view of another input device of the embodiment. As shown in FIG. 5, magnet detection elements 19A and 19B parallelly arranged in the right-and-left direction of ball 11 and magnet detection elements 19C and 19D arranged in the back-and-forth direction may be wider spaced from each other than in FIG. 2.

As described hereinbefore, in to input device of the embodiment, magnetic body 12 having projections 14 radially extending from core 13 toward the outer periphery of ball 11 is arranged inside boll 11. As another feature of the input device, ring magnet 18 and magnet detection elements 19A-19D are surrounded by the lower area of the ball 11 so as to be opposite thereto. This allows the input device to have no components such as rollers that are in contact with ball 11. As a result, the input device is protected from dust and dirt during long-term use, thus maintaining a good tactile feel in a simple structure.

In the above-described structure, magnetic body 12 arranged in ball 11 includes cylindrical projections 14 radially extending from spherical core 13 toward the outer periphery of ball 11. In the present invention, however, the core can be formed in a different shape as long as it connects projection 14. For example, instead of making core 13 hollow as in the embodiment, projections 14 can be extended toward at the center of ball 11 and connected to each other at the center.

Furthermore, projections 14 of magnetic body 12, which are cylindrical in the embodiment, can be rectangular prism, polygonal prism, conical, or pyramidal.

In the above-described structure, it is easy to arrange magnetic elements. However, if the above-mentioned magnetic loop is formed, the ball position surrounded by ring magnets is not restricted just the lower area of the ball.

Thus, the input device of the present invention having a good tactile feel in a simple structure is mainly useful to operate various electronic apparatuses.

What is claimed is:

1. An input device comprising:
    a ball rotatably fitted into a case;
    a magnetic body housed inside the ball;
    a ring magnet, a lower portion of the ball being located inside the ring magnet; and
    a plurality of magnet detection elements facing the lower portion of the ball, the plurality of magnet detection elements predeterminedly spaced from the ball, wherein the magnetic body includes a plurality of projections and a core, the plurality of projections being radially extending from the core toward an outer periphery of the ball.

2. The input device of claim 1, wherein the magnet detection elements are predeterminedly spaced in parallel from each other.

3. The input device of claim 1, wherein the ring magnet has a cylindrical shape, a lower portion of the ball being located inside the cylindrical shape.

* * * * *